(12) United States Patent
Buchs et al.

(10) Patent No.: US 8,622,346 B2
(45) Date of Patent: Jan. 7, 2014

(54) FUSELAGE STRUCTURE MADE OF COMPOSITE MATERIAL

(75) Inventors: Wolfgang Buchs, Oberndorf (DE); Gabriele Dreher, Harburg (DE); Umberto Girard, Bissingen (DE); Steffen Kunze, Vagen (DE); Thomas Thiess, Harburg-Ebermengen (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 182 days.

(21) Appl. No.: 13/191,734

(22) Filed: Jul. 27, 2011

(65) Prior Publication Data
US 2012/0025022 A1   Feb. 2, 2012

(30) Foreign Application Priority Data
Aug. 2, 2010   (EP) .................................... 10400035

(51) Int. Cl.
*B64C 1/14*   (2006.01)
(52) U.S. Cl.
USPC ..................... 244/129.5; 244/119; 244/129.4; 52/801.11; 52/841
(58) Field of Classification Search
USPC ........... 244/119, 123.1, 123.14, 123.2, 123.3, 244/129.4, 129.5, 133, 630, 800.1, 801.1, 244/801.11, 841; 52/630, 800.1, 801.1, 52/801.11, 841
See application file for complete search history.

(56) References Cited

U.S. PATENT DOCUMENTS

| 4,966,802 A | 10/1990 | Hertzberg |
| 5,817,269 A | 10/1998 | Younie |
| 6,217,000 B1 * | 4/2001 | Younie et al. ................. 249/184 |

FOREIGN PATENT DOCUMENTS

| WO | 2007062641 A2 | 6/2007 |
| WO | 2007106035 A1 | 9/2007 |

OTHER PUBLICATIONS

Search Report and Written Opinion; Application No. EP 10400035; dated Dec. 8, 2010.

* cited by examiner

*Primary Examiner* — Timothy D Collins
*Assistant Examiner* — Nicholas McFall
(74) *Attorney, Agent, or Firm* — Brooks Kushman P.C.

(57) ABSTRACT

A fuselage structure, particularly an aircraft door (1) of composite material comprising at least one panel (2) and at least one beam (3) mounted to each other and the panel (2) with the panel (2) being formed of at least one group of composite layers (5, 6, 20). The at least one beam (3) is provided at least at one of its respective ends (10, 11) with a flange (13) suitable for adhesive engagement with the at least one panel (2). The at least one group of composite layers (5, 6, 20) of the panel (2) is in form locking engagement with this flange (13) of the beam (3).

14 Claims, 3 Drawing Sheets

FUSELAGE STRUCTURE MADE OF COMPOSITE MATERIAL

CROSS REFERENCE TO RELATED APPLICATIONS

The present application claims the benefit of European patent application EP 10 400035.1 filed on Aug. 2, 2010, the disclosure of which is incorporated herein by reference.

BACKGROUND OF THE INVENTION (1) Field of the Invention

The present invention relates to a fuselage structure made of composite material, particularly aircraft doors of composite material and especially it relates to passenger doors of an aircraft with the features of the preamble of claim 1.

(2) Description of Related Art

During a flight at cruising altitude an air excess pressure of 0.6 bar inside a fuselage of an aircraft relative to the surrounding is provided on behalf of the comfort of the passengers. The excess pressure inside the fuselage is withheld by a skin formed of panels attached to an inner frame structure such as beam elements of the fuselage. The excess pressure on the skin of the fuselage exerts a severing effect of the skin from the inner frame structure of the fuselage. Aircraft doors as part of the fuselage are exposed to the same severing effects. Aircraft doors have to be highly reliable with respect to pressure resistance (typ. 10 pwr-9/flighthour). In case of an emergency landing aircraft doors have to open highly reliable (typ. 10 pwr-7/flighthour).

It is known to mount aircraft doors of composite material by riveting the panels to the beam elements of the frame structure of such an aircraft door. The rivets carry out and distribute the loads generated by internal pressure and deformations due to flight loads. Such rivets increase the manufacturing cost and the combination "rivets-composites" increase maintenance issues.

SUMMARY OF THE INVENTION

It is an object of the present invention to provide for highly reliable fuselage structure made of composite material with low weight and low production costs.

The invention is solved with a fuselage structure made of composite material with the features of claim 1. Preferred embodiments of the invention are presented in the subclaims.

According to the invention a fuselage structure made of composite material, particularly a passenger door of an aircraft is provided with at least one panel and an inner frame structure mounted to each other. The panel is formed of at least one layer or preferably at least one group of layers of composite material. The inner frame structure is provided with at least one beam with at least at one of its respective ends a flange suitable for adhesive engagement with the at least one panel. At least one group of layers of composite material of the panel is in form locking engagement with this flange of the beam. The invention allows highly reliable aircraft doors of composite material with low weight and low production costs by transferring loads from inner excess pressure by means of form lock supplemental to adhesive mounting between panels of the skin and inner structural elements such as beams or frames of a fuselage. Expensive and heavy rivets can be avoided according to the inventive concept. All kinds of fiber reinforced plastics as well as additional adhesive layers (e.g. film adhesives) may be applied for bonding the respective layers in addition to form lock. A one-shot technology in e. g. Resin Transfer Molding could be chosen for optimized low weight and low production costs of the inventive aircraft door.

According to a preferred embodiment of the invention at least one group of layers of composite material of the panel and the flange of the beam are overlapping each other for the form locking engagement.

According to another preferred embodiment of the invention at least one end of the at least one beam is T-shaped.

According to another preferred embodiment of the invention at least one group of layers of composite material of the panel is interrupted for the form locking engagement with the flange of the beam.

According to another preferred embodiment of the invention at least one panel is provided with two groups of layers of composite material or with an extra group of layers inside of the two groups of layers of composite material with the inner layers of composite material of the panel being interrupted for the interlocking engagement with the flange of the beam. The extra inner group of layers of composite material inside the two groups of layers of composite material of the panel may preferably be used for reinforcement of the connections between the panel and the beams of the inner frame structure and in order to prevent peeling effects.

According to another preferred embodiment of the invention the at least one panel is provided with sandwich elements apart from the areas of contact between the at least one panel and the at least one beam. The sandwich elements extend along sections of the panels to reinforce the panels.

According to another preferred embodiment of the invention the at least one beam is provided with respective even outer surfaces and an even inner surface mounted to the outside of the outer composite layers being interrupted with a cut-out to provide overlapping parts for form lock with the even inner surface of the flange. The flange is provided at its even outer surface with additional composite layers to maintain stability and stiffness of the outer skin assembly.

BRIEF DESCRIPTION OF THE DRAWINGS

A preferred embodiment of the invention is presented in the attached drawings.

DETAILED DESCRIPTION OF THE PREFERRED EMBODIMENTS

Figure 1:
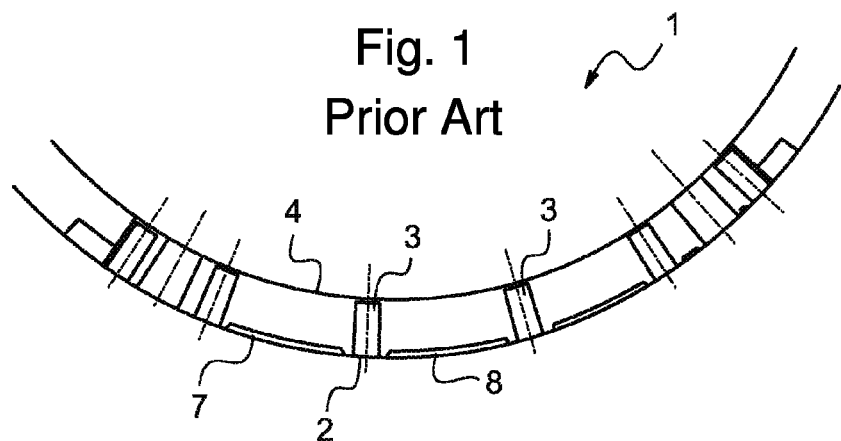
FIG. 1 shows a cross sectional view of an aircraft door according to the state of the art.

FIG. 1, 2: An aircraft door 1 of composite material, particularly a passenger door is provided with panels 2 forming an outer skin and beams 3 and frames 4 forming an inner frame structure. Sandwiches 7, 8 are provided at sections of the panels 2. Beams 3 and frames 4 are fitted to each other and are fitted essentially vertical to the panels 2 at areas without sandwiches 7, 8. All beams 3 and frames 4 are monolithic laminates. For mounting of the aircraft door 1 to the fuselage (not shown) the outer curvature of the aircraft door 1 is adapted to the outer shape of the fuselage.

Figure 3:
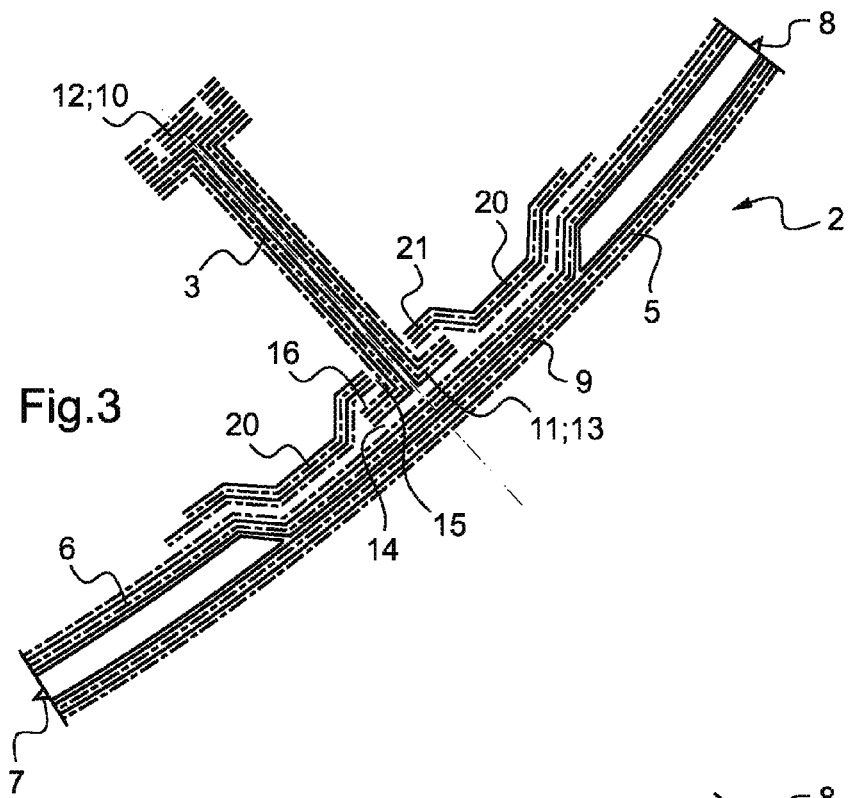
FIG. 3 shows a schematic view through a section of an aircraft door according to the invention.

FIG. 3: Corresponding features are referred to with the numerals of FIG. 1, 2. The panel 2 is formed of a first group of layers 5 of composite material for an outer skin and a second inner group of layers 6 of composite material. Composite layers 5, 6 form first and second sandwich structures 7, 8. Between the first and second sandwich structures 7, 8 the two groups 5, 6 of layers of composite material are cured together to a monolithic panel section 9. An extra group of layers 20 of composite material is attached inside of the monolithic panel section 9 overlapping parts of the first and second sandwich structures 7, 8.

One beam 3 of the inner frame structure is provided at its respective ends 10, 11 with flanges 12, 13 with respective even outer surfaces 14. Flange 13 is adhesively engaged with its even outer surface 14 to the inside of the monolithic panel section 9. The extra group of layers 20 of composite material attached inside of the monolithic panel section 9 is interrupted with a cut-out 15. The dimensions of the cut-out 15 are smaller than the dimensions of flange 13 to provide overlapping parts 21 of the extra group of layers 20 of composite material for form lock with an even inner surface 16 of the flange 13.

Figure 2:
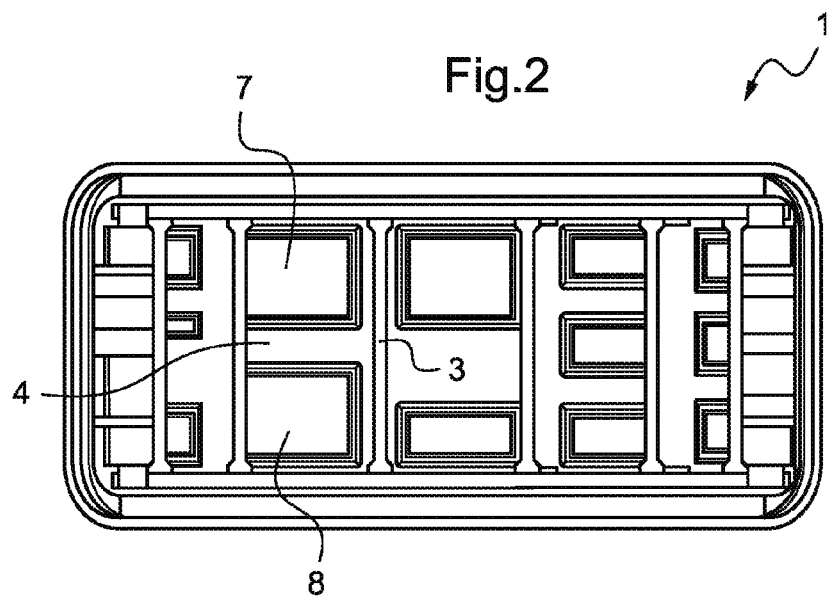
FIG. 2 shows a frontal view of an aircraft door according to the state of the art.
Figure 4:
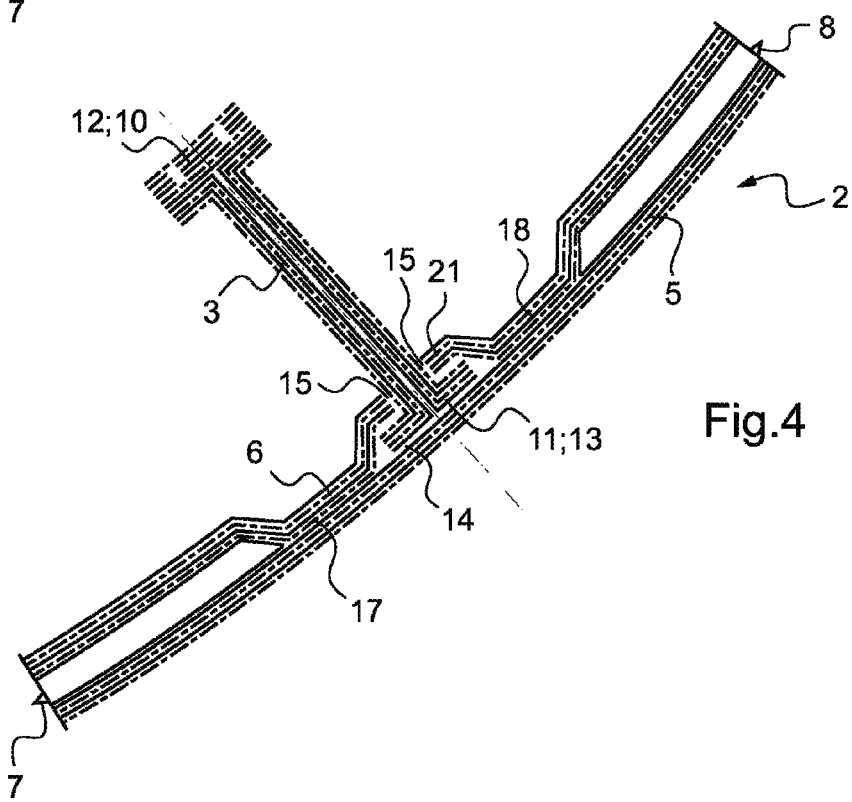
FIG. 4 shows a schematic view through a further section of an aircraft door according to the invention.

FIG. 4: Corresponding features are referred to with the numerals of FIGS. 1, 2 and 3. The panel 2 is formed of an outer group of layers 5 of composite material and an inner group of layers 6 of composite material. Composite layers 5, 6 are formed to first and second sandwich structures 7, 8. Between the first and second sandwich structures 7, 8 the two groups of composite layers 5, 6 are cured together to monolithic panel sections 17, 18.

The beam 3 of the inner frame structure is provided at its respective ends 10, 11 with flanges 12, 13 with respective even outer surfaces 14. Flange 13 is adhesively and potentially rectangular fixed with its even outer surface 14 to the outer composite layer 5 between the monolithic panel sections 17, 18. The inner composite layer 6 between the monolithic panel sections 17, 18 is interrupted with a hole 15 to provide overlapping parts 21 for form lock with the even inner surface 16 of flange 13.

Figure 5:
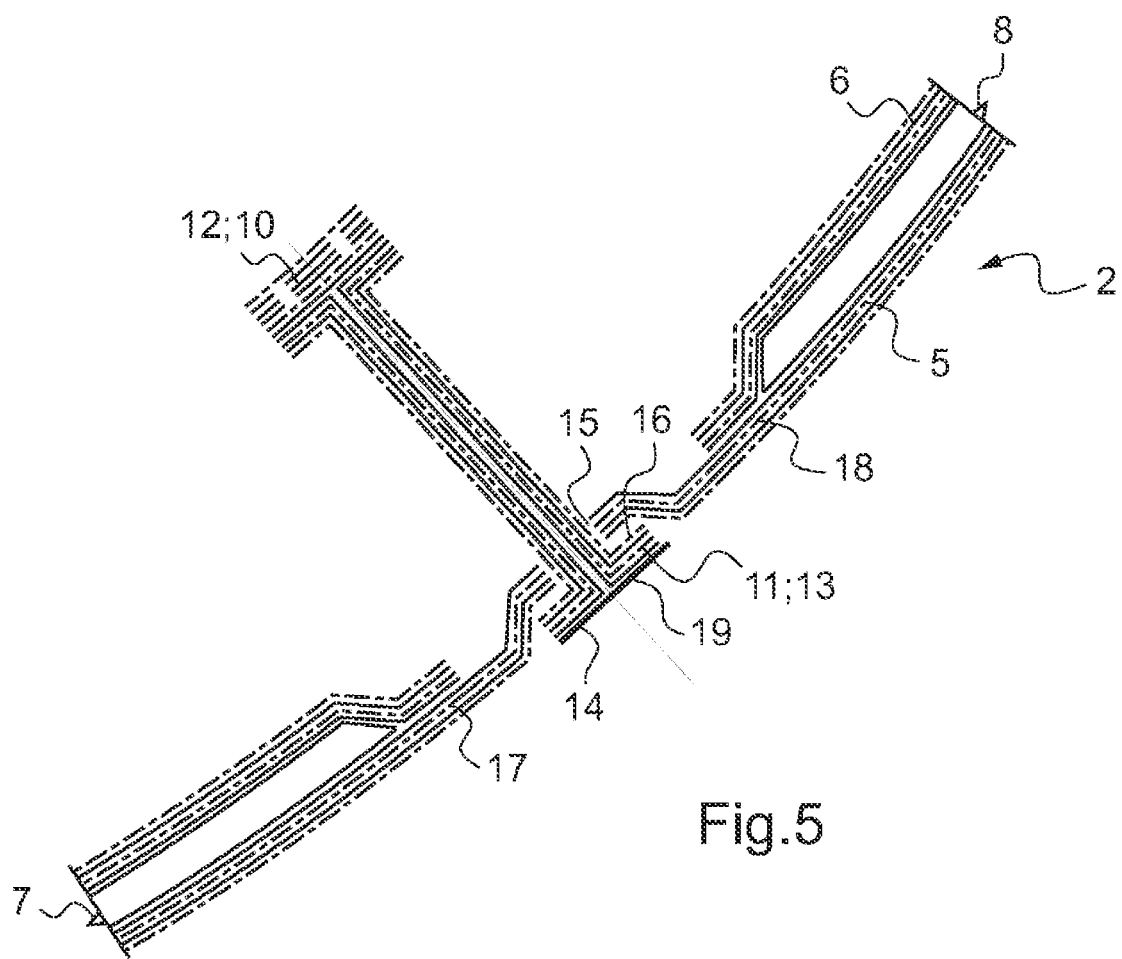
FIG. 5 shows a schematic view through another section of an aircraft door according to the invention.

FIG. 5: Corresponding features are referred to with the numerals of FIG. 1-4. The panel 2 is formed of an outer group of composite layers 5 and an inner group of composite layers 6 forming first and second sandwich structures 7, 8. Between the first and second sandwich structures 7, 8 the inner and outer groups of composite layers 5, 6 are cured together to monolithic panel sections 17, 18.

The beam 3 is provided with an even outer surface 14 and an even inner surface 16 at its flange 13. The outer group of composite layers 5 is interrupted with a cut-out 15 through which the beam 3 is reaching such that the even inner surface 16 at its flange 13 is essentially rectangular fixed to the outside of the outer group of composite layers 5. The outer group of composite layers 5 is at the hole 15 overlapping partly the even inner surface 16 for form lock with flange 13. Flange 13 is provided at its even outer surface 14 with additional composite layers 19.

Combinations of the embodiments according to FIG. 3-5 are within the scope of the invention.

All groups of composite layers 5, 6 and 20 are monolithic laminates. For reduced weight and reduced costs Resin Transfer Molding (RTM) also known as Resin-Injection Process using a closed-mold pressure injection system process was applied in combination with the so-called one-shot technology (detailed in: Plastverarbeiter 2002, No. 12, page 62).

What is claimed is:

1. A fuselage structure of composite material, comprising:
at least one panel being formed of at least one group of composite layers and having sandwich elements; and
at least one beam mounted the panel and provided with a flange positioned at least at one of its respective ends, and an essentially even outer surface and an essentially even inner surface at its flange, wherein the flange is configured for adhesive engagement with the at least one panel and the flange is in form locking engagement with the at least one group of composite layers of the panel;
wherein sandwich elements of the at least one panel are apart from the areas of contact between the at least one panel and the at least one beam;
wherein the at least one group of composite layers includes an outer group of composite layers being interrupted with a hole through which the beam is reaching;
wherein the essentially even inner surface at the flange of the beam is mounted to the outside of the outer group of composite layers; and
wherein the outer group of composite layers with the hole is overlapping partly the even inner surface for form lock with flange.

2. A fuselage structure according to claim 1, wherein the at least one group of composite layers of the panel is overlapping onto the flange of the beam for the form locking engagement.

3. A fuselage structure according to claim 1, wherein the at least one end of the at least one beam is T-shaped.

4. A fuselage structure according to claim 1, wherein the at least one group of composite layers of the panel is interrupted for the form locking engagement with the flange of the beam.

5. A fuselage structure according to claim 1, wherein the at least one panel is formed of two groups of composite layers.

6. A fuselage structure according to claim 5, wherein the at least one panel is formed with an extra group of composite layers inside of the two groups of composite layers.

7. A fuselage structure according to claim 5, wherein the inner layer of the panel is interrupted for the interlocking engagement with the flange of the beam.

8. A fuselage structure according to claim 1, wherein flange is provided at its even outer surface with additional composite layers.

9. A fuselage structure according to claim 1, wherein the at least one group of composite layers of the at least one panel includes an inner group of composite layers and an outer group of composite layers; and
wherein sandwich elements are interposed between the inner group of composite layers and the outer group of composite layers.

10. The fuselage structure according to claim 1, wherein the fuselage structure is configured as a passenger door.

11. An aircraft door formed from a composite material, the door comprising:
a panel formed from an outer group of composite layers and an inner group of composite layers, the panel having sandwich structures interposed between the inner and outer layers to reinforce the panel, wherein the outer group of composite layers provides an outer skin of the door, the outer group of composite layers defining a first cutout;
an additional group of composite layers defining a second cutout, the additional group of composite layers arranged in contact with an inner surface of the inner group of composite layers;

at least one beam having a flange positioned at an end of the beam, the flange being in form locking engagement with the panel to form a monolithic structure;

wherein the inner and outer groups of composite layers are cured to one another to provide a monolithic panel section between the flange and sandwich elements such that the sandwich elements are spaced apart from the flange of the beam;

wherein the beam extends through the first and second cutouts such that an inner surface of the flange is in contact with an outer surface of the outer group of composite layers.

12. The aircraft door according to claim 11, wherein the inner group of composite layers defines a third cutout; and wherein the beam extends through the third cutout.

13. The aircraft door according to claim 11, wherein the outer surface of the flange is generally flush with the outer surface of the outer group of composite layers to provide a smooth outer skin for the door.

14. The aircraft door according to claim 11, wherein the inner group of composite layers are spaced apart from the flange of the beam.

* * * * *